United States Patent [19]
Woodward

[11] Patent Number: 5,284,288
[45] Date of Patent: Feb. 8, 1994

[54] METHOD OF MANUFACTURING AN ARTICLE BY DIFFUSION BONDING

[75] Inventor: James Woodward, Lancashire, England

[73] Assignee: Rolls-Royce plc, London, England

[21] Appl. No.: 83,484

[22] Filed: Jun. 30, 1993

[30] Foreign Application Priority Data

Aug. 15, 1992 [GB] United Kingdom ............... 9217415

[51] Int. Cl.⁵ ..................... B23K 20/14; B23K 20/18
[52] U.S. Cl. .................................. 228/157; 228/186; 228/193; 228/221
[58] Field of Search ............... 228/157, 193, 221, 186

[56] References Cited

U.S. PATENT DOCUMENTS 3,066,390 12/1962 Jack ................................. 228/157 X
3,066,393 12/1962 Malagari ............................. 228/186
4,538,756 9/1985 Trenkler et al. ................. 228/157 X

*Primary Examiner*—Kenneth J. Ramsey
*Attorney, Agent, or Firm*—Cushman, Darby & Cushman

[57] ABSTRACT

A plurality of titanium sheets are assembled into a stack. One of the sheets is provided with a stop off material on one surface to prevent diffusion bonding at predetermined positions. The edges of the sheets are welded together and a pipe is welded to the stack to interconnect with the stop off material to form a sealed assembly. The sealed assembly is evacuated. The sealed assembly is heated to evaporate the binder from the stop off and the binder is extracted from the assembly. The pipe is then sealed by two spaced welds. The assembly is heated and externally pressurized to diffusion bond the sheets together. The region of the pipe between the assembly and the first seal and the region of the pipe between both seals collapse to indicate a successful diffusion bond, or one or both regions are uncollapsed to indicate an unsuccessful diffusion bond. An integral structure formed by a successful diffusion bond is then superplastically formed to produce an article.

14 Claims, 2 Drawing Sheets

METHOD OF MANUFACTURING AN ARTICLE BY DIFFUSION BONDING

The present invention relates to a method of manufacturing an article by diffusion bonding, and particularly relates to a method of manufacturing an article by superplastic forming and diffusion bonding.

It is known to manufacture hollow metallic articles by superplastic forming and diffusion bonding metal workpieces. These metal workpieces include elementary metal, metal alloys, intermetallic materials and metal matrix composites. At least one of the metal workpieces must be capable of superplastic extensions.

In one known process of diffusion bonding the surfaces of the workpieces to be joined are cleaned. The workpieces are arranged in a stack and the edges of the workpieces are welded together, except where a pipe is welded to the workpieces, to form an assembly. The pipe enables a vacuum, or inert gas pressure, to be applied to the interior of the assembly. The sealed assembly is placed in a pressure vessel and is heated and pressed to diffusion bond the workpieces together to form an integral structure. Diffusion bonding occurs when two mating surfaces are pressed together under temperature, time and pressure conditions that allow atom interchange across the interface such that the interface effectively ceases to exist.

In one known process of superplastic forming and diffusion bonding the surfaces of the workpieces to be joined are cleaned, and at least one surface of one or more of the workpieces is coated in preselected areas with a material to prevent diffusion bonding. The workpieces are arranged in a stack and the edges of the workpieces are welded together, except where a pipe is welded to the workpieces, to form an assembly. The pipe enables a vacuum, or inert gas pressure, to be applied to the interior of the assembly. The assembly is placed in an autoclave and heated so as to "bake out" the binder from the material used to prevent diffusion bonding. The assembly is then evacuated and the pipe is sealed. The sealed assembly is placed in a pressure vessel and is heated and pressed to diffusion bond the workpieces together to form an integral structure. Diffusion bonding occurs when two mating surfaces are pressed together under temperature, time and pressure conditions that allow atom interchange across the interface. The first pipe is removed and a second pipe is fitted to the diffusion bonded assembly at the position where the first pipe was located. The integral structure is located between appropriately shaped dies and is placed within an autoclave. The integral structure and dies are heated and pressurised fluid is supplied through the second pipe into the interior of the integral structure to cause at least one of the workpieces to be superplastically formed to produce an article matching the shape of the dies.

In these known method of diffusion bonding and superplastic forming and diffusion bonding it is essential that there is a vacuum in the sealed assembly in order to ensure that a satisfactory diffusion bond is formed between the workpieces when they are subsequently heated and pressed together. There is no instant and reliable indication that a satisfactory diffusion bond has been formed between the workpieces nor an indication of why a diffusion bond has not been formed.

The present invention seeks to provide a novel method of manufacturing an article by diffusion bonding which reduces, or overcomes, the above mentioned disadvantages.

The present invention provides a method of manufacturing an article by diffusion bonding at least two metal workpieces comprising the steps of (a) assembling the at least two workpieces into a stack relative to each other so that the surfaces are in mating abutment, (b) sealing the edges of the at least two workpieces together, except where a pipe is to be inserted, and joining a pipe to the stack to provide a sealed assembly, (c) sequentially evacuating the interior of the sealed assembly and supplying inert gas to the interior of the sealed assembly through the pipe to remove oxygen from the interior of the sealed assembly, (d) evacuating the interior of the sealed assembly, (e) sealing the pipe with a first seal and sealing the pipe with a second seal spaced from the first seal, (f) applying sufficient heat and pressure across the thickness of the at least two workpieces to diffusion bond the at least two workpieces together to form an integral structure and to collapse the pipe at a first region between the joint between the pipe and the stack and the first seal and to collapse the pipe at a second region between the first seal and the second seal, (g) observing the first and second regions of the pipe to determine whether a successful diffusion bond has been formed between the workpieces in the stack to form an integral structure.

Preferably, before the workpieces are stacked together, a stop off material is applied to preselected areas of at least one of the surfaces of at least one of the at least two metal workpieces to prevent diffusion bonding at the preselected areas, before the pipe is sealed the sealed assembly is placed in an oven while the sealed assembly is continuously evacuated, the sealed assembly is heated while it is within the oven to evaporate volatile binder from the stop off material while the sealed assembly is continuously evacuated to remove the volatile binder from between the at least two metal workpieces of the sealed assembly, after the integral structure is formed the integral structure is heated and is internally pressurised to cause some of the preselected areas of at least one of the workpieces to be superplastically formed to produce an article of predetermined shape. Preferably the edges of the workpieces are welded together.

Preferably the step of sequentially evacuating the interior of the sealed assembly and supplying inert gas to the interior of the sealed assembly through the pipe to remove oxygen from the interior of the sealed assembly is performed a plurality of times.

Preferably, before the pipe is sealed, the sealed assembly is cooled whilst the sealed assembly is continuously evacuated.

The sealed assembly is preferably heated to a temperature between 250° C. and 350° C. to evaporate the volatile binder from the stop off material.

Where the workpieces are made of a titanium alloy, the workpieces are heated to a temperature equal to or greater than 850° C. and the pressure applied is equal to or greater than $20 \times 10^5$ Nm$^{-2}$ to diffusion bond the workpieces together to form an integral structure.

Preferably the workpieces are heated to a temperature between 900° C. and 950° C. and the pressure applied is between $20 \times 10^5$ Nm$^{-2}$ and $30 \times 10^5$ Nm$^{-2}$.

The integral structure is heated to a temperature equal to or greater than 850° C. to superplastically form the integral structure.

Preferably the integral structure is heated to a temperature between 900° C. and 950° C.

Preferably the first and second seals in the pipe are formed by resistance welding. Preferably the resistance welding is spot welding.

The present invention will be more fully described by way of example with reference to the accompanying drawings, in which.

Figure 1:
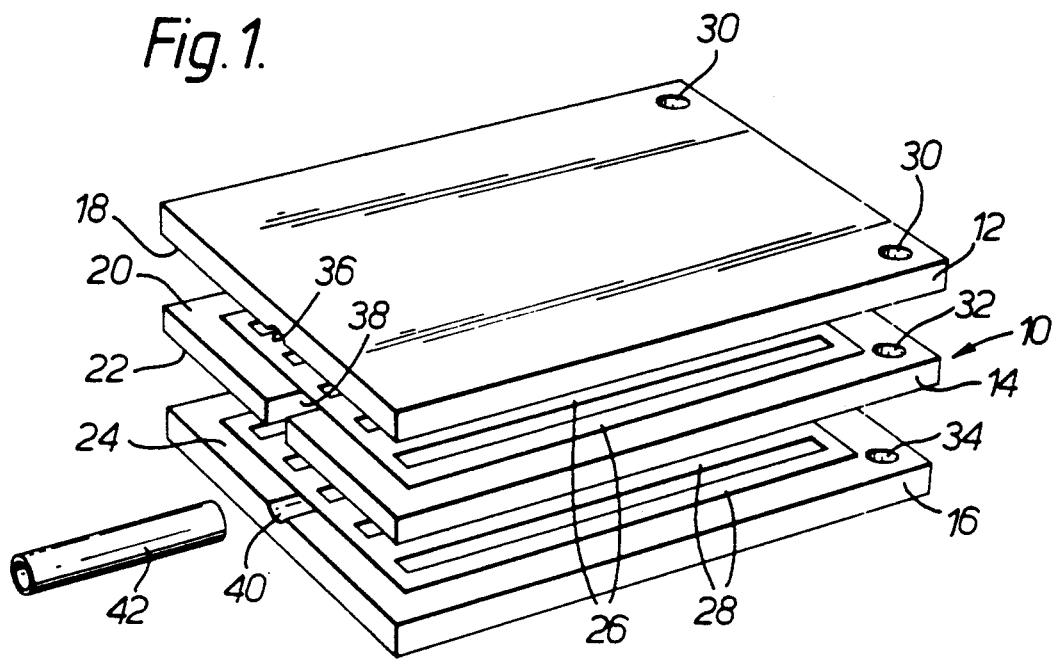
FIG. 1 illustrates an exploded view of a stack of workpieces which are superplastically formed and diffusion bonded to form an article according to the present invention.

In FIG. 1, three sheets of titanium alloy 12,14 and 16 are assembled into a stack 10.

Prior to assembling the sheets 12,14 and 16 into the stack 10, the mating surfaces 18,20,22 and 24 of the sheets 12,14 and 16 are prepared for diffusion bonding by chemical cleaning. One of the mating surfaces 18 and 20 in this example, mating surface 20, has had a stop off material applied, and one of the mating surfaces 22 and 24, in this example mating surface 24, has had a stop off material applied. The stop off may comprise powdered yttria in a binder and solvent e.g. The stop off known as "Stopyt 62A" which is sold by an American company named GTE Service Corporation of 100 Endicott Street, Danvers, Mass. 01923 U.S.A.

The stop off material is applied in desired patterns 26 and 28, shown as the shaded areas in FIG. 1, by the known silk screen printing process. The desired patterns 26 and 28 of stop off material prevent diffusion bonding between preselected areas of the sheets 12,14 and 16. In this example the stop off is applied in straight lines, but it may be applied as dots or other suitable patterns depending on the particular article to be manufactured. The three sheets of titanium alloy 12,14 and 16 are then assembled into the stack 10. The sheet 12 has a pair of dowel holes 30 which are axially aligned with corresponding dowel holes 32 in sheet 14 and with corresponding dowel holes 34 in sheet 16 to ensure the correct positional relationship between the three sheets 12,14 and 16 in the stack 10. The sheets 12,14 and 16 are maintained in this positional relationship by a pair of dowels (not shown) which are inserted in the axially aligned dowel holes 30,32 and 34.

Figure 2:
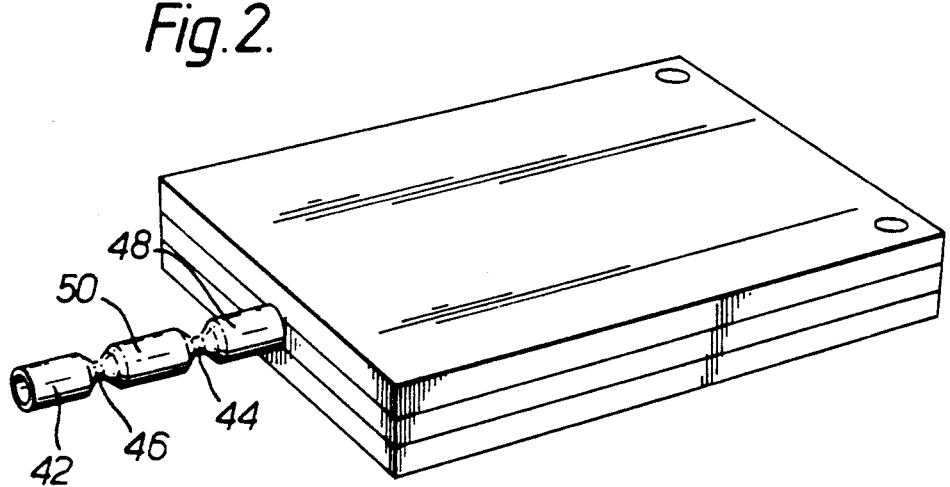
FIG. 2 illustrates a view of a stack of workpieces after welding together and before diffusion bonding.

The sheets 12,14 and 16 of the stack 10 are placed together to trap an end of a pipe 42. In this example a groove 36 is machined on surface 18 of sheet 12, a slot 38 is machined through sheet 14 and a groove 40 is machined on surface 24 of sheet 16. The slot 38 in sheet 14 extends between the surfaces 20 and 22 to interconnect the pattern of stop material between the sheets 12 and 14 with the pattern of stop off between the sheets 14 and 16. The pipe 42 is positioned so as to project from between the three sheets 12,14 and 16. One end of the pipe 42 interconnects with the pattern of stop off material between the sheets 12,14 and also with the pattern of stop off material between sheets 14,16. On completion of the assembly in the manner described it is welded about its periphery, so as to weld the edges of sheets 12 and 14 together, and so as to weld the edges of sheets 14 and 16 together. The pipe 42 is also welded around its periphery to the sheets 12,14 and 16. A sealed assembly is formed except for the inlet provided by the pipe 42 as shown in FIG. 2.

It is of course possible to machine grooves on the mating surfaces of one pair of sheets to trap an end of a pipe, and to provide apertures, or slots through one of these sheets to interconnect with the stop off patterns between all the sheets. As a further alternative it is possible to machine grooves on each set of mating surfaces of the sheets to trap an end of a pipe. In this variant a number of pipes are required. In the last two possibilities it is possible to machine the grooves in one, or both, of the mating surfaces of the sheets.

The pipe 42 is then connected to a vacuum pump which is used to evacuate the interior of the sealed assembly and then inert gas, for example argon, is supplied to the interior of the sealed assembly. This process of evacuating and supplying inert gas to the interior of the interior of the sealed assembly may be repeated several times in order to ensure that most, or substantially all, traces of oxygen are removed from the interior of the sealed assembly. The particular number of times that the interior of the sealed assembly is evacuated and purged with inert gas depends upon the size of the workpieces and upon the required integrity of the finished component. The smaller the traces of oxygen remaining, the greater the quality of the subsequent diffusion bond. The inert gas is supplied to pressurise the interior of the sealed assembly to atmospheric pressure.

The sealed assembly is evacuated and is placed into an oven. The sealed assembly is then heated to a temperature between 250° C. and 350° C. to evaporate the binder from the stop off material. During the baking out of the binder, the sealed assembly is continuously evacuated to remove the binder from between the sheets. After the binder has been removed, which is determined either by monitoring the binder levels in the gas extracted from the sealed assembly or by maintaining the sealed assembly at the temperature between 250° C. and 350° C. for a predetermined time, the sealed assembly is removed from the oven and is allowed to cool to ambient temperature whilst being continuously evacuated. The binder is baked out of the sealed assembly at a suitably low temperature to reduce, or prevent, oxidation of the exterior surfaces of the sealed assembly.

The pipe 42 is then sealed at two spaced location 44,46, as shown in FIG. 2 so that there is a vacuum in the sealed assembly. The pipe 42 is sealed at the locations 44,46 by any suitable method, for example resistance welding e.g. spot welding or seam welding. The first seal 44 is located a suitable distance, approximately ¾ to 1 inch, i.e. 18 to 25 mm, from the stack 10 to form a first portion 48 of pipe 42. The second seal 46 is located a suitable distance, approximately ¼ to ¾ inch, i.e 6 to 18 mm, from the first seal 44 in a direction away from the stack 10 to form a second portion 50 of pipe 42 between the seals 44 and 46. The sealed assembly is then transferred carefully to an autoclave because the stop off is brittle and easily damaged. Alternatively a predetermined amount of binder may be left in the stop off material, so that the stop off is not to brittle, to enable the sealed assembly to be transferred more easily to the autoclave without damage to the stop off.

The temperature in the autoclave is increased such that the sealed assembly is heated to a temperature greater than 850° C. and the argon pressure in the autoclave is raised to greater than 20 atmospheres, 294 pounds per square inch ($20.26 \times 10^5 Nm^{-2}$) and held at that temperature and pressure for a predetermined time. Preferably the sealed assembly is heated to a temperature between 900° C. and 950° C. and the pressure is between 294 pounds per square inch ($20.26 \times 10^5 Nm^{-2}$) and 441 pounds per square inch ($30.39 \times 10^5 Nm^{-2}$). For example if the sealed assembly is heated to 925° C. and the pressure is raised to 300 lbs/sq.in the temperature and pressure are held constant for about 2 hours. The pressure is then reduced to ambient, diffusion bonding having been achieved and the sealed assembly, which is then an integral structure, is removed.

Figure 3:
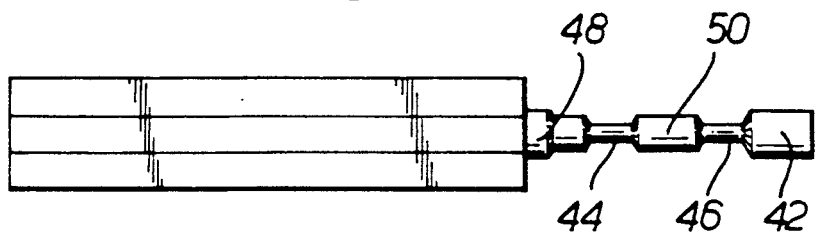
FIG. 3 illustrates a successfully diffusion bonded stack of workpieces.

After the diffusion bonding cycle has finished, the sealed assembly/integral structure and pipe 42 is inspected. If both the portions 48,50 of the pipe 42 have collapsed, as shown in FIG. 3, due to the pressure applied to the sealed assembly during the diffusion bonding cycle, this indicates that a successful diffusion bond has been formed between the workpieces.

Figure 4:
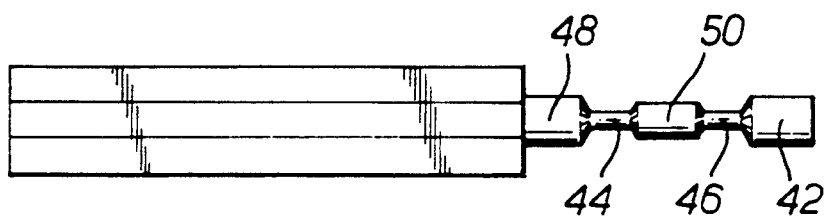
FIG. 4 illustrates an unsuccessfully diffusion bonded stack of workpieces.

If the first portion 48 of the pipe 42 has not collapsed, but the second portion 50 of the pipe 42 has collapsed, as shown in FIG. 4, this indicates that a successful diffusion bond has not been formed between the workpieces. The collapsed second portion 50 of the pipe 42 indicates that there was a vacuum present in the sealed assembly at the time of sealing the pipe 42, that the diffusion bond bonding cycle has taken place, and therefore that the weld seal around the periphery of the workpieces has failed to allow air to flow into the assembly. It is then possible to locate the failure of the weld seal in the periphery of assembly, to re-weld at this location and to repeat the diffusion bonding cycle.

Figure 5:
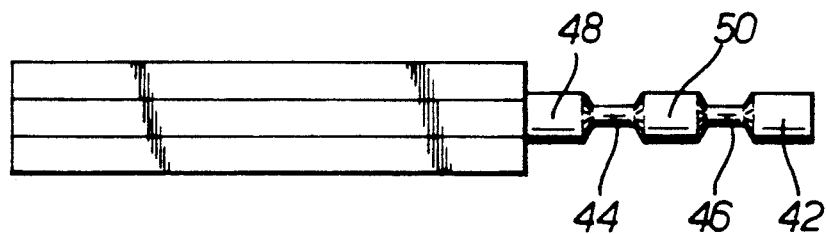
FIG. 5 illustrates another unsuccessfully diffusion bonded stack of workpieces.

If both the portions 48,50 of the pipe 42 have not collapsed, as shown in FIG. 5, this indicates that a successful diffusion bond has not been formed between the workpieces. The uncollapsed portions 48,50 indicate that a vacuum was not present in the sealed assembly at the time of sealing the pipe 42, or that there is a failure of the resistance welds 44,46 allowing air into the sealed assembly, or possibly that the diffusion bonding cycle has not taken place. Any discolouration of the workpieces may mean that the heating part of the cycle had taken place without the application of a suitable pressure.

The use of the two seals 44,46 in the pipe 42 gives an indication that a satisfactory diffusion bond has been produced between the workpieces, or gives an indication that a diffusion bond has not been formed together with an indication of why the diffusion bond was not produced.

It is also possible to transfer the sealed assembly directly to the autoclave, immediately after the pipe 42 is sealed without the requirement to cool the sealed assembly to ambient temperature, however some cooling of the sealed assembly may occur.

The pipe 42 is removed and a second pipe is fitted to the integral structure, and argon is introduced into the areas, within the integral structure, containing the stop off in order to break the adhesive grip which the diffusion bonding pressure has brought about. The argon is carefully introduced to those areas which contain the stop off, and the argon seeps through the stop off and eventually reaches the opposing end of the integral structure. The argon may initially be caused to travel between one pair of workpieces and on reaching the opposite end return to the inlet end between another pair of workpieces. In any event, the argon must travel the whole length of the interior of the integral structure such as to break the adhesive grip between the stop off and the sheets brought about during the diffusion bonding step.

This step is carried out at room temperature because the metal is elastic at room temperature and the minimal extension which occurs does not go beyond the elastic limit. Consequently, the integral structure regains its shape when pressure is removed at the end of the step. If this step is attempted whilst the structure is at the common diffusion bonding and superplastic forming temperature, there is a serious risk of progressive plastic deformation lengthwise of the integral structure, rather than simultaneous deformation over the whole structure. In such circumstances, rupturing of the integral structure frequently occurs.

The integral structure is placed between appropriately shaped split dies positioned within an autoclave. The integral structure is again heated between the dies to a temperature greater than 850° C., preferably between 900° and 950°. In this example, the dies and integral structure are heated to 925° C. Argon is introduced into the interior of the integral structure between the adjacent sheets, so as to force the outer sheets 12,16 into the respective die half shapes which generates an internal structure depending on the pattern of the applied stop off.

The magnitude of the movement of at least one of the sheets during deformation, is such as to require superplastic extension to occur. The term "superplastic" is a standard term in the metal forming art and will not be described herein.

In order to achieve superplastic forming without rupturing the thinning metal the argon is introduced in a series of pulses, at a pre-calculated rate which will achieve a desired strain rate, as is taught at pp 615-623 in the book "The Science, Technology and Applications of Titanium" edited by R. I. Jaffe and N. E. Promisel, published by Pergamon Press in 1970, which is hereby incorporated by reference. The method ensures that the metal is subjected to that strain rate which will achieve the maximum permissible speed of extension at any given point in the procedure. The rate of application, and/or volume of the gas pulses may thus vary during the expansion of the sheets.

On completion of superplastic forming, the inert argon atmosphere within the integral structure is maintained whilst the structure is cooled. This integral structure may be the finished article, or some final machining of the integral structure may be required to produce the finished article.

Although the description has referred to titanium sheets or titanium workpieces the present invention is equally applicable to workpieces of other elementary metals, metal alloys, intermetallics and metal matrix composites which are diffusion bondable and one of the workpieces must be capable of superplastic extension. Aluminium and stainless steel are capable of superplastic extension at suitable temperatures and pressures. Although the description has referred to a stack of three metal sheets it is possible to use stacks comprising two metal sheets or stacks comprising four or more metal sheets depending upon the particular article to be manufactured.

The method is suitable for manufacturing heat exchangers, components for turbomachines, for example fan blades, fan duct outlet guide vanes etc.

Although the invention has been described with reference to a method of superplastic forming and diffusion bonding it is equally applicable to a method of diffusion bonding only. In the method of diffusion bonding only it will not be necessary to apply stop off to the workpieces, nor to evaporate binder and remove binder from the stack of workpieces.

The invention has been described with reference to solid state diffusion bonding, but it is equally possible to use activated diffusion bonding in which metal foil activators are placed between the workpieces and which melt and immediately solidify to form the diffusion bond at the bonding temperature.

I claim:

1. A method of manufacturing an article by diffusion bonding at least two metal workpieces comprising the steps of
    (a) assembling the at least two workpieces into a stack relative to each other so that the surfaces are in mating abutment,
    (b) sealing the edges of the at least two workpieces together, except where a pipe is to be inserted, and joining a pipe to the stack to provide a sealed assembly,
    (c) sequentially evacuating the interior of the sealed assembly and supplying inert gas to the interior of the sealed assembly through the pipe to remove oxygen from the interior of the sealed assembly,
    (d) evacuating the interior of the sealed assembly,
    (e) sealing the pipe with a first seal, and sealing the pipe with a second seal which is spaced from the first seal,
    (f) applying sufficient heat and pressure across the thickness of the at least two workpieces to diffusion bond the at least two workpieces together to form an integral structure and to collapse the pipe at a first region between the joint between the pipe and the stack and the first seal and to collapse the pipe at a second region between the first seal and the second seal,
    (g) observing the first and second regions of the pipe to determine whether a successful diffusion bond has been formed between the workpieces in the stack to form an integral structure.

2. A method as claimed in claim 1 wherein before the workpieces are stacked together, applying a stop off material to preselected areas of at least one of the surfaces of at least one of the at least two metal workpieces to prevent diffusion bonding at the preselected areas, before the pipe is sealed placing the sealed assembly in an oven while the sealed assembly is continuously evacuated, heating the sealed assembly while it is within the oven to evaporate volatile binder from the stop off material while the sealed assembly is continuously evacuated to remove the volatile binder from between the at least two metal workpieces of the sealed assembly, after the integral structure is formed heating and internally pressurising the integral structure to cause some of the preselected areas of at least one of the workpieces to be superplastically formed to produce an article of predetermined shape.

3. A method as claimed in claim 2 comprising heating the stack to a temperature between 250° C. and 350° C. to evaporate the volatile binder from the stop off material.

4. A method as claimed in claim 2 wherein, where the workpieces are made of titanium alloy, heating the integral structure to a temperature equal to or greater than 850° C. to superplastically form the integral structure.

5. A method as claimed in claim 4 comprising heating the integral structure to a temperature between 900° C. and 950° C.

6. A method as claimed in claim 1 comprising welding the edges of the workpieces together.

7. A method as claimed in claim 1 wherein before the pipe is sealed, cooling the sealed assembly whilst the sealed assembly is continuously evacuated.

8. A method as claimed in claim 7 comprising cooling the sealed assembly to ambient temperature.

9. A method as claimed in claim 1 comprising welding the pipe to form the first and second seals in the pipe.

10. A method as claimed in claim 9 comprising resistance welding the pipe to form the first and second seals in the pipe.

11. A method as claimed in claim 10 comprising spot welding the pipe to form the first and second seals in the pipe.

12. A method as claimed in claim 1 wherein, where the workpieces are made of a titanium alloy, heating the workpieces to a temperature equal to or greater than 850° C. and applying pressure equal to or greater than $20 \times 10^5$ $Nm^{-2}$ to diffusion bond the workpieces together to form an integral structure.

13. A method as claimed in claim 12 comprising heating the workpieces to a temperature between 900° C. and 950° C. and the pressure applied is between $20 \times 10^5$ $Nm^{-2}$ and $30 \times 10^5$ $Nm^{-2}$.

14. A method as claimed in claim 1 in which the step of sequentially evacuating the interior of the sealed assembly and supplying inert gas to the interior of the sealed assembly through the pipe to remove oxygen from the interior of the sealed assembly is performed a plurality of times.

* * * * *